(12) United States Patent
Wobben

(10) Patent No.: US 9,206,617 B2
(45) Date of Patent: Dec. 8, 2015

(54) TOWER AND FOUNDATION

(76) Inventor: Aloys Wobben, Aurich (DE)

( * ) Notice: Subject to any disclaimer, the term of this patent is extended or adjusted under 35 U.S.C. 154(b) by 1234 days.

(21) Appl. No.: 11/547,387

(22) PCT Filed: Apr. 4, 2005

(86) PCT No.: PCT/EP2005/003499
§ 371 (c)(1),
(2), (4) Date: Aug. 19, 2008

(87) PCT Pub. No.: WO2005/095792
PCT Pub. Date: Oct. 13, 2005

(65) Prior Publication Data
US 2008/0302038 A1 Dec. 11, 2008

(30) Foreign Application Priority Data

Apr. 2, 2004 (DE) .......................... 10 2004 017 006

(51) Int. Cl.
*E04H 12/08* (2006.01)
*E04H 12/22* (2006.01)
*E02D 27/42* (2006.01)
*F03D 11/04* (2006.01)
*E04B 1/41* (2006.01)

(52) U.S. Cl.
CPC ............ *E04H 12/2269* (2013.01); *E02D 27/42* (2013.01); *E04B 1/40* (2013.01); *E04H 12/085* (2013.01); *E04H 12/2284* (2013.01); *F03D 11/045* (2013.01); *F05B 2240/912* (2013.01); *Y02E 10/728* (2013.01)

(58) Field of Classification Search
CPC . F03D 11/045; E04H 12/085; E04H 12/2269; E04H 12/2284; E02D 27/42; E04B 1/40; F05B 2240/912; Y02E 10/728
USPC .................. 52/295, 296, 126.1, 126.3, 126.4; 416/DIG. 6; 405/231, 239, 250, 251; 248/679, 678
See application file for complete search history.

(56) References Cited

U.S. PATENT DOCUMENTS 962,699 A 6/1910 Conzelman
1,506,173 A 8/1924 Hagen et al.
(Continued)

FOREIGN PATENT DOCUMENTS

DE 1045735 12/1958
DE 3809113 A1 9/1989
(Continued)

OTHER PUBLICATIONS

English Translation of Japanese Patent 54-19504 ("Column Footing") provided by the USPTO and translated by the Mcelroy Translation Company in Jan. 2014.*

*Primary Examiner* — James Ference
*Assistant Examiner* — Charissa Ahmad
(74) *Attorney, Agent, or Firm* — Seed IP Law Group PLLC

(57) ABSTRACT

A method of erecting a pylon, in particular a pylon of a wind power installation, which has a foundation with segment anchors, wherein connecting elements project beyond the top side of the foundation by a predetermined amount. A ring is leveled, aligned and fixed at the top side of the foundation. A gap produced by leveling, aligning and fixing of the ring is underlaid with a grouting material. The grouting material is set and a lower pylon segment is placed on the leveled, aligned and fixed ring and connected thereto.

11 Claims, 2 Drawing Sheets

(56) References Cited

U.S. PATENT DOCUMENTS

| | | | |
|---|---|---|---|
| 2,724,261 A | 11/1955 | Rensaa | |
| 3,645,057 A | 2/1972 | Kaplan | 52/295 |
| 3,713,262 A | 1/1973 | Jatcko | 52/296 |
| 3,829,540 A * | 8/1974 | Cox | 264/34 |
| 3,834,094 A | 9/1974 | Ferguson | 52/122 |
| 3,927,497 A * | 12/1975 | Yoshinaga et al. | 52/169.1 |
| 4,169,569 A * | 10/1979 | Riegler et al. | 248/680 |
| 4,327,703 A | 5/1982 | Destree | 125/1 |
| 4,331,314 A * | 5/1982 | Chacour et al. | 248/679 |
| 4,365,929 A | 12/1982 | Retz | 415/2 R |
| 4,438,607 A * | 3/1984 | Nelson | 52/126.1 |
| 4,785,593 A | 11/1988 | Munoz, Jr. | 52/126.1 |
| 4,887,691 A | 12/1989 | Rotondo | 181/210 |
| 5,110,082 A * | 5/1992 | Rowan, Jr. | 248/678 |
| 5,249,401 A | 10/1993 | Schmid | |
| 5,308,195 A | 5/1994 | Hotek | 405/284 |
| 5,379,563 A * | 1/1995 | Tinsley | 52/295 |
| 5,419,683 A * | 5/1995 | Peace | 416/227 A |
| 5,437,519 A * | 8/1995 | Bullivant | 405/239 |
| 5,505,033 A * | 4/1996 | Matsuo et al. | 52/296 |
| 5,586,417 A * | 12/1996 | Henderson et al. | 52/295 |
| 5,678,382 A * | 10/1997 | Naito | 52/745.21 |
| 5,707,180 A | 1/1998 | Vickars et al. | 405/233 |
| 5,826,387 A | 10/1998 | Henderson et al. | |
| 5,966,882 A * | 10/1999 | Naito | 52/295 |
| 6,050,038 A | 4/2000 | Fey et al. | |
| 6,264,402 B1 | 7/2001 | Vickars et al. | 405/239 |
| 6,318,034 B1 | 11/2001 | Zavitz et al. | 52/194 |
| 6,470,645 B1 | 10/2002 | Maliszewski et al. | 52/745.18 |
| 6,503,024 B2 * | 1/2003 | Rupiper | 405/230 |
| 6,672,023 B2 | 1/2004 | Henderson | 52/296 |
| 6,705,058 B1 | 3/2004 | Foust et al. | 52/720.1 |
| 6,808,350 B1 * | 10/2004 | Tooman et al. | 411/431 |
| 7,025,176 B1 * | 4/2006 | Tooman | 184/101 |
| 7,155,875 B2 | 1/2007 | Henderson | 52/741.15 |
| 7,222,464 B2 * | 5/2007 | Suehiro | 52/295 |
| 7,441,743 B2 * | 10/2008 | Behlinger et al. | 248/679 |
| 8,037,646 B2 | 10/2011 | Wobben | |
| 2002/0154952 A1 | 10/2002 | Gunter | 405/118 |
| 2003/0021636 A1 | 1/2003 | Silber | |
| 2003/0196393 A1 * | 10/2003 | Bowman et al. | 52/295 |
| 2004/0131428 A1 * | 7/2004 | Henderson | 405/233 |
| 2007/0006541 A1 | 1/2007 | Seidel | |
| 2008/0155907 A1 | 7/2008 | Wobben | 52/169.13 |
| 2008/0302038 A1 | 12/2008 | Wobben | |
| 2009/0068007 A1 | 3/2009 | Erickson et al. | 415/213.1 |

FOREIGN PATENT DOCUMENTS

| | | | | |
|---|---|---|---|---|
| DE | 10009072 A1 | 8/2001 | | |
| DE | 100 45 735 A1 | 3/2002 | | |
| DE | 10226996 A1 | 4/2003 | | |
| DE | 102 38 033 | 3/2004 | | |
| DK | 174190 B1 | 9/2001 | | |
| EP | 0447326 B1 | 6/1993 | | |
| EP | 1526278 A1 | 4/2005 | | |
| EP | 2108836 A2 | 10/2009 | | |
| EP | 1735533 B1 | 8/2011 | | |
| FR | 2 692 611 | 12/1993 | | |
| GB | 606545 | 8/1948 | | |
| GB | 2273310 A | 6/1994 | | |
| JP | 54-19504 | 2/1979 | | |
| JP | 55-78722 | 6/1980 | | |
| JP | 55078722 A | 6/1980 | | |
| JP | 55-172440 | 12/1980 | | |
| JP | 59068432 A * | 4/1984 | | E02D 27/00 |
| JP | 05302339 A * | 11/1993 | | E02D 29/02 |
| JP | 07305356 A * | 11/1995 | | E02D 27/00 |
| JP | 08189029 A * | 7/1996 | | E02D 5/20 |
| JP | 8-209721 A | 8/1996 | | |
| JP | 08209721 A | 8/1996 | | |
| JP | 09158215 A | 6/1997 | | |
| JP | 09302674 A * | 11/1997 | | |
| JP | 09302675 A * | 11/1997 | | |
| JP | 10121576 A | 12/1998 | | |
| JP | 2000034733 A * | 2/2000 | | E02D 27/00 |
| JP | 2000282570 A * | 10/2000 | | E04B 1/24 |
| JP | 2003-293938 | 10/2003 | | |
| WO | 00/43599 A1 | 7/2000 | | |
| WO | 02/27105 A1 | 4/2002 | | |
| WO | 2004057113 A1 | 7/2004 | | |
| WO | 2005/095792 A1 | 10/2005 | | |

* cited by examiner

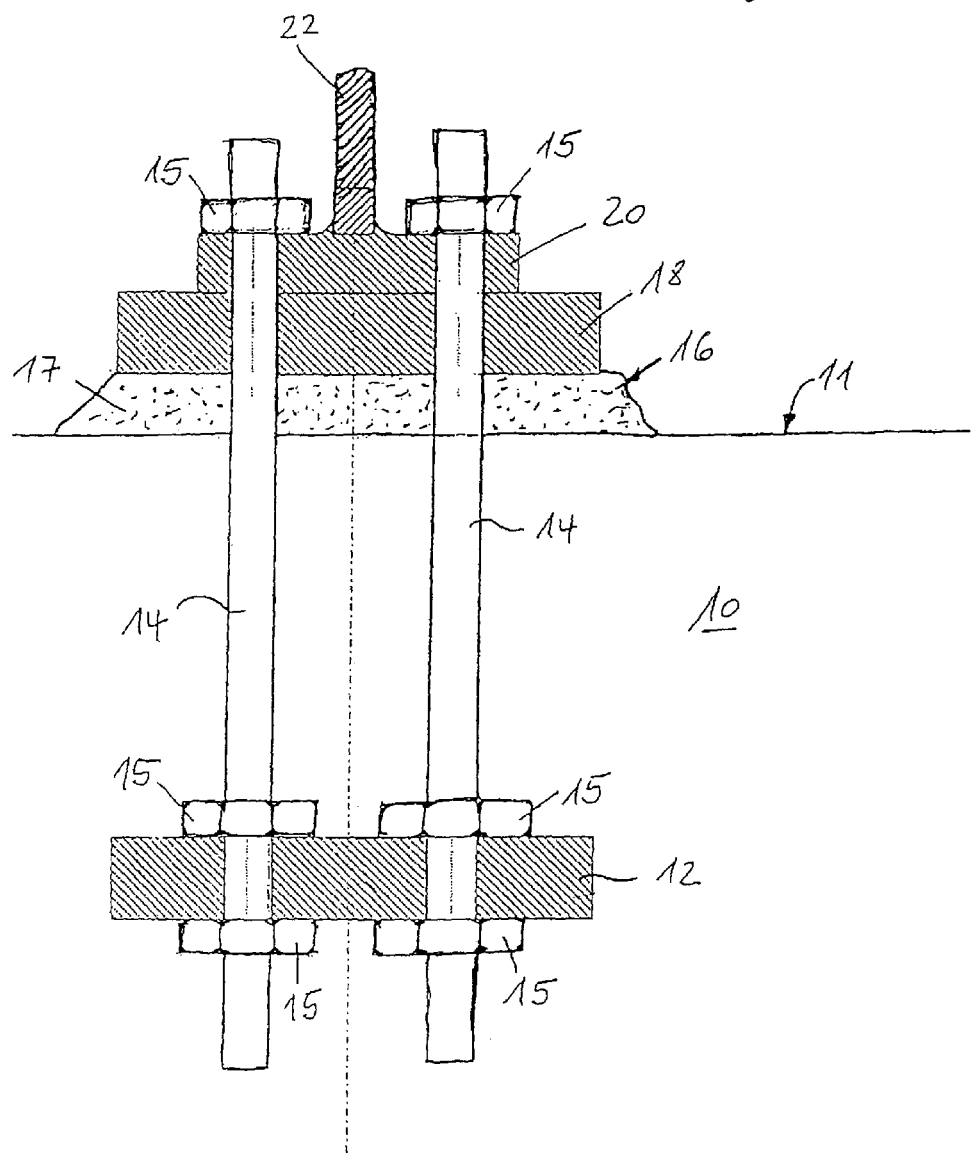

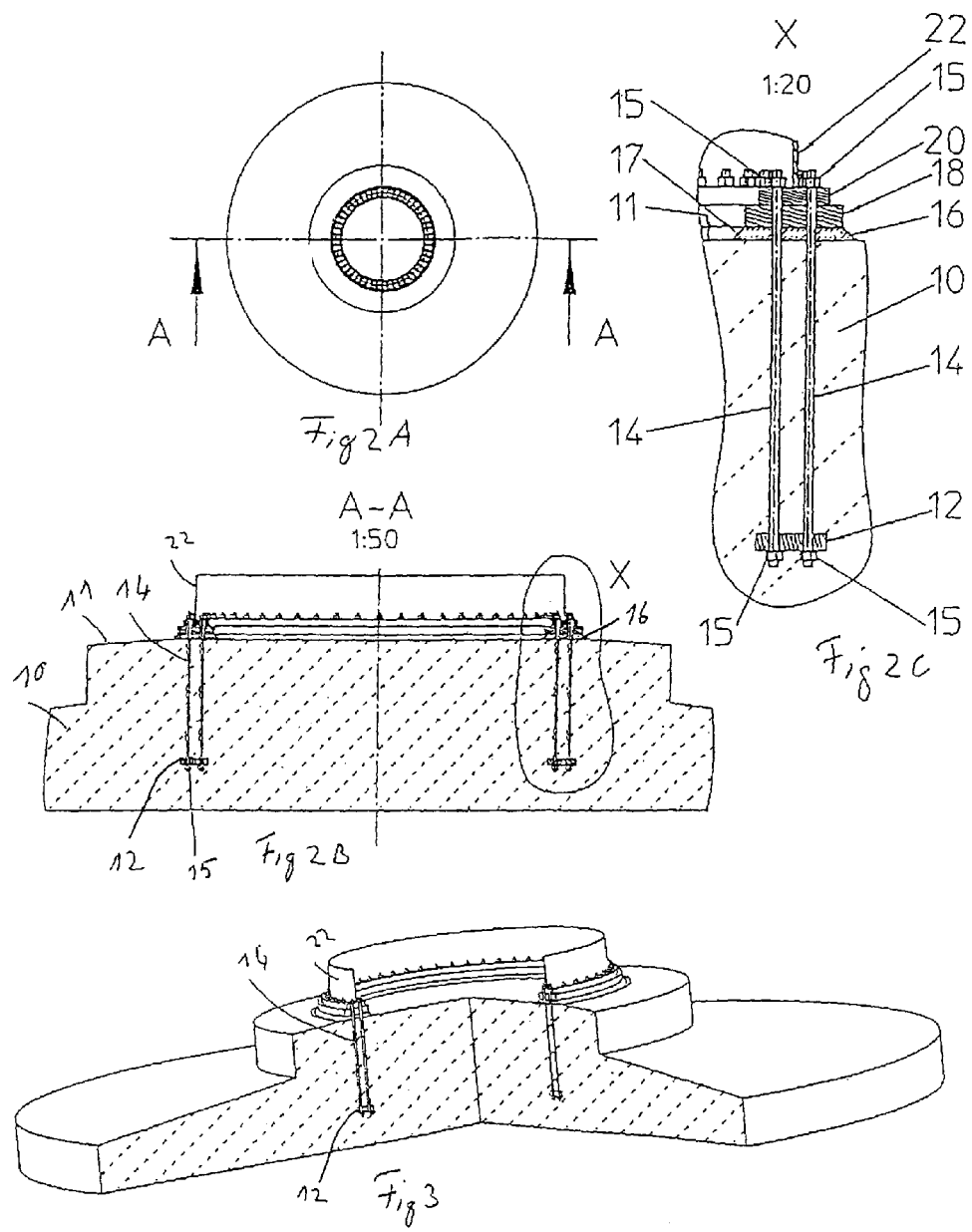

TOWER AND FOUNDATION

BACKGROUND OF THE INVENTION

1. Field of the Invention

The present invention concerns a method of erecting a tower or pylon and a wind power installation with such a pylon.

2. Description of the Related Art

U.S. Pat. No. 5,826,387 discloses a foundation and a method of producing a foundation which can be used for example for wind power installations. U.S. Pat. No. 6,050,038 discloses a foundation system. DE 100 45 735 A1 discloses a means of fixing a column on a concrete foundation. DE 102 26 996 A1 discloses a method of producing a foundation, in particular for a pylon of a wind power installation.

It is known in the state of the art, when erecting a pylon in particular for a wind power installation, for a lower pylon segment to be placed on the connecting elements which project out of a foundation, with a base flange. That lower pylon segment is properly aligned (leveled) and fixed in the aligned position. In that case there is a gap between the base flange of the lower pylon segment and the top side of the foundation. That gap is filled with a grouting material which then has to set before it can be loaded and the pylon further constructed thereon. Setting can certainly take up to 24 hours.

A large crane is required for handling the lower pylon segment. That crane however is only further used for constructing the pylon after the grouting material has set. Shifting the crane for the period during which the gap grouting is setting is however too complicated and expensive and therefore does not happen. Accordingly the costly crane is stopped and inactive for 24 hours.

BRIEF SUMMARY OF THE INVENTION

Therefore the object of the invention is to efficiently carry out the structure of a pylon, in particular a pylon of a wind power installation.

That object is attained by a method of erecting a pylon as set forth in claim 1, a wind power installation with a pylon as set forth in claim 3, and a method of using a leveling ring for erecting a pylon as set forth in claim 4.

Therefore there is provided a method of erecting a pylon, in particular a pylon of a wind power installation, which has a foundation with segment anchors, wherein the connecting elements project beyond the top side of the foundation by a predetermined amount. A ring is leveled, aligned and fixed at the top side of the foundation. A gap which has been formed by leveling, aligning and fixing of the ring is underlaid with a grouting material. After the grouting material has set a lower pylon segment is placed on the leveled, aligned and fixed ring and connected thereto. In that case the ring may also be formed from a plurality of segments.

In that respect the invention is based on the realization that it is not leveling of the lower pylon section that is important, but the fact that it is exactly aligned in situ. That however can also be achieved using a leveling ring. Such a leveling ring is comparable to a flange ring which can be handled with a markedly lower level of effort and expenditure than the lower pylon section, for example with a vehicle-mounted crane. Also precise alignment (leveling) of the leveling ring is simpler than the corresponding procedure in relation to a pylon section. In addition the leveling ring, when of greater width and/or thickness, can be made from a less high-grade material than the pylon flange. The pylon flange can also be reduced in its width. In that way it is possible to make better use of the transport width.

After alignment and fixing the leveling ring can be underlaid with grouting material in known manner and the material can set. During that time however the (vehicle-mounted) crane can already be used for other tasks while the crane required for handling the pylon sections is not yet needed.

It is only when the material in the gap has hardened that the large crane must be ready to erect the pylon, for example of a wind power installation, and can then relatively quickly erect the pylon segment by segment.

A particularly rational structure for the pylon can be implemented if prefabricated finished parts, in particular concrete finished parts, are used for the foundation. They are delivered ready for installation on the building site and connected to produce a foundation which can then be further used immediately and thus in such a way as to save time.

BRIEF DESCRIPTION OF THE SEVERAL VIEWS OF THE DRAWING(S)

The invention is described hereinafter with reference to the Figures.

FIG. 1 is a diagrammatic view in section of a portion of a pylon base,

FIG. 2A shows a plan view of a pylon base,

FIG. 2B shows a view in section taken along line A-A of the pylon base of FIG. 2A, FIG. 2C shows a view on an enlarged scale of the portion X in FIG. 2B, and FIG. 3 shows a perspective view of a pylon base.

DETAILED DESCRIPTION OF THE INVENTION

A foundation 10 can be in the form of a prefabricated finished part foundation but also in the form of an on-site mixed concrete foundation or a foundation made from supplied ready-mix concrete. One or more segment anchors 12 are provided in the foundation 10. Those segment anchors 12 can be adapted in shape and number to the particular demands of the foundation. Thus it is possible to use a segment anchor which for example is in one piece in relation to on-site mixed concrete foundations or foundations produced from ready-mix concrete, that segment anchor being woven into the reinforcement. In the case of prefabricated finished part foundations in contrast a plurality of segment anchors are used, which are adapted in respect of their shape to the finished part. It will be appreciated that a plurality of segment anchors can also be used in relation to an on-site mixed concrete structure or a structure produced from supplied ready-mix concrete.

Connecting elements 14 are connected to the segment anchor 12. The connecting elements 14 can be in the form of screwthreaded rods which are fixed with nuts 15 in a predetermined position to the segment anchor 12. The fixing elements 14 extend a predetermined distance outside the foundation 10 above the top side 11 of the foundation. Instead of a screw connection it is also possible to use a welded connection.

A leveling ring 18 which is formed in one piece or a plurality of pieces is then arranged on the top side 11 of the foundation. The leveling ring 18 is exactly leveled so that it forms a perfectly aligned base for the pylon.

When the leveling ring 18 is aligned a gap 16 inevitably occurs between the top side 11 of the foundation and the leveling ring 18. As soon as the leveling ring 18 is fixed in its predetermined position the gap 16 is filled with a grouting material 17. After setting or hardening of that grouting material 17 the leveling ring 18 can be loaded in its desired position and a lower pylon segment with a lower flange ring 20 and an illustrated pylon wall plate 22 can be placed on the leveling ring 18. The screwthreaded rods 14 engage through suitably positioned holes in the leveling ring 18 and in the lower flange ring 20 of the lower pylon section and nuts 15 are fitted thereon in order to connect the lower pylon section fixedly to the foundation 10 by way of the leveling ring 18.

FIG. 2A shows a plan view of a pylon base. FIG. 2B shows a cross-section taken along line A-A in FIG. 2A. As in FIG. 1, shown here is a foundation 10 with a foundation surface 11. In particular two segment anchors 12 and four screwthreaded rods 14 are shown. The portion X is shown on an enlarged scale in FIG. 2C. That view substantially corresponds to the view in FIG. 1.

FIG. 3 shows a perspective view of the pylon base with a portion thereof cut open. Leveling of the pylon base is effected as described with reference to FIG. 1.

As the pylon for example of a wind power installation can now be constructed in one go a crane only has to be provided once for speedy pylon erection, but until then the crane can perform other tasks.

Logistical tasks are also simplified. Hitherto the lower pylon section had to be on site at least 24 hours before the other parts of the pylon in order to be able to satisfactorily install it. It will be appreciated that the other parts of the pylon could also be supplied at the same time. They however could not be constructed at the same time and therefore took up additional space on the building site, for the waiting time.

The method according to the invention means that the pylon segments can be delivered in a transport process to the erection point just in time. That also eliminates additional transloading procedures, more specifically firstly from the transport vehicle to intermediate storage on the ground and then later from there to the location of installation. Rather pylon segments which are delivered just in time can be unloaded from the transport vehicle and fitted in place immediately.

With the above-described solution care is to be taken to ensure that the grouting material must always be applied with at least a minimum thickness, which is dependent on the material used for the grout, because that grouting material is required to transmit the forces from the pylon to the foundation. If the grouting material is applied too thinly, that layer can fracture and give rise to considerable damage.

The above-described solution has been found to be advantageous in terms of efficiently carrying out rationalizing the erection of a pylon, in particular a pylon of a wind power installation. On the other hand the costs and material properties also play a not insignificant part. It should be pointed out that the lowermost flange of a pylon segment must be made from a very high-grade material in order to be able to carry the loads originating from the pylon. If a pylon of that kind is set up on a concrete foundation then the concrete is the weaker one of the two aspects of the connection. Accordingly the pylon flange must be broader in width so that the concrete of the foundation is not overloaded. Consequently the flange in the lower pylon segment must be of a width which is oversized in relation to the steel which is used in that respect. That is to be considered as a disadvantage in particular in terms of the costs of the steel used in that respect.

By virtue of the insertion of the leveling ring it is now possible in accordance with the invention to insert a kind of transitional step between the highly loadable but cost-intensive steel of the lower pylon segment and the lower-loadable concrete of the foundation. Thus the leveling ring can be of a sufficient width to transmit the loads of the wind power installation to the foundation without risk. On the other hand it is possible to use better or cheaper steel at that location and thus the flange on the lower pylon segment can be made correspondingly narrower and thus less expensively in terms of material and cost.

A further advantage is enjoyed when the leveling ring is made in the form of segments and can thus be stacked and transported in segment-wise manner. If the leveling ring is of a large diameter, that is not a problem in accordance with the invention from the point of view of transportation because it can be stacked in segment-wise manner. The lower pylon segment has a narrower base flange of a smaller width as now the base flange can be material-specifically sized. The transport width can thus also be correspondingly reduced.

Erection for example of a pylon of a wind power installation on land was described in the example set forth hereinbefore. Erecting a pylon of a wind power installation off-shore, that is to say in the water or in the sea, can also be effected by means of the above-described leveling ring and a corresponding leveling procedure before a lower pylon segment is mounted in place.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation comprising:
a foundation with a plurality of segment anchors embedded therein, the plurality of segment anchors being radially arranged;
a leveling ring which is aligned and fixed on a top side of the foundation, the leveling ring having an upper surface that is level to provide in situ leveling of pylon segments while erecting a pylon, the leveling ring including a plurality of circumferentially spaced holes at an outer circumference of the leveling ring and a plurality of circumferentially spaced holes at an inner circumference of the leveling ring;
a pylon which has at least one pylon segment, the at least one pylon segment including a lower pylon segment that includes a lower flange ring and a pylon wall plate, the lower flange ring including a plurality of circumferentially spaced holes at an outer circumference of a width of the leveling ring and a plurality of circumferentially spaced holes at an inner circumference of the leveling ring, the lower pylon segment being located on the leveling ring, the lower flange ring of the lower pylon segment being on top of the leveling ring;
a plurality of pairs of single, integral, continuous, uninterrupted bolts, each of the segment anchors coupled to a respective pair of the single, integral, continuous, uninterrupted bolt, wherein each single, integral, continuous, uninterrupted bolt of the pairs of bolts has a first end coupled to the respective segment anchor and a second end that projects a predetermined distance above a top side of the foundation, each single, integral, continuous, uninterrupted bolt of the pairs of bolts being positioned on opposite sides of the pylon wall plate;

a gap located between the top side of the foundation and the leveling ring that is produced by aligning and fixing the leveling ring;

a grouting material that has been placed in the gap after the upper surface of the level ring has been leveled, each single, integral, continuous, uninterrupted bolt extending from a respective one of the plurality of anchors embedded in the foundation, through the grouting material, through the leveling ring, and through the lower flange ring of the pylon segment, one of single, integral, continuous, uninterrupted bolts of each pair extending through a hole in the outer circumference of the leveling ring and the lower flange ring and the other of the pair of the single, integral, continuous, uninterrupted bolts extending through a hole in the inner circumference of the leveling ring and the lower flange ring; and a nut coupled to the top end of each of the bolts of the pairs of the single, integral, uninterrupted bolts, overlying the lower flange ring of the pylon segment and holding the lower flange ring in a butting contact with the leveling ring.

2. The wind power installation of claim 1 wherein the leveling ring is a lower grade material than a material of the lower flange ring of the lower pylon segment.

3. The wind power installation of claim 1 wherein a width of the leveling ring is greater than a width of the lower flange ring of the lower pylon segment.

4. The wind power installation of claim 1 wherein the leveling ring is formed of a plurality of segments.

5. The wind power installation of claim 1 wherein the leveling ring is steel.

6. A wind power installation, comprising:

a foundation having an upper support surface and a plurality of segment anchors embedded therein, the plurality of segment anchors being radially arranged;

a plurality of pairs of single, integral, continuous, uninterrupted bolts, each of the plurality of segment anchors being coupled to one of the pairs of single, integral, continuous, uninterrupted bolts, each of the single, integral, continuous, uninterrupted bolts having a first end that is coupled to the respective one of the plurality of segment anchors and a second end extending above the upper support surface of the foundation;

a leveling ring horizontally aligned above and offset from the upper support surface of the foundation, the leveling ring having an upper surface that is level to provide in situ leveling of the pylon segments while erecting a pylon, the leveling ring including a plurality of circumferentially spaced holes at an outer circumference of a width of the leveling ring and a plurality of circumferentially spaced holes at an inner circumference of the leveling ring to receive the single, integral, continuous, uninterrupted bolts, therethrough;

a pylon including a lower pylon segment, the lower pylon segment including a pylon wall plate and a lower flange ring transversely aligned with respect to the pylon wall plate, the lower flange ring directly supported by the leveling ring and held in abutment therewith by nuts coupled to the top of the plurality of pairs of single, integral, continuous, uninterrupted bolts, the lower flange ring having a plurality of circumferentially spaced holes at an outer circumference of the leveling ring width and a plurality of circumferentially spaced holes at an inner circumference of the leveling ring; and a grouting material which fills a gap between the leveling ring and the upper support surface of the foundation, one of the single, integral, continuous, uninterrupted bolts of each pair extending through a hole in the outer circumference of the leveling ring and the lower flange ring and the other of the pair of the single, integral, continuous, uninterrupted bolts extending through a hole in the inner circumference of the leveling ring and the lower flange ring.

7. The wind power installation of claim 6 wherein the leveling ring is a steel material having a lower grade than a steel material of the lower flange ring of the lower pylon segment.

8. The wind power installation of claim 6 wherein a width of the leveling ring is greater than a width of the lower flange ring of the lower pylon segment.

9. The wind power installation of claim 6 wherein the leveling ring is formed of a plurality of segments.

10. The wind power installation of claim 6 wherein the foundation is concrete and the leveling ring is steel, and wherein the grouting material fills the gap otherwise present between the upper support surface of the concrete foundation and the steel leveling ring.

11. The wind power installation of claim 6 wherein the leveling ring is level and the upper support surface of the foundation is non-level, and the grouting material fills the gap otherwise present between the non-level upper support surface of the foundation and the level leveling ring.

* * * * *